H. T. EARLES.
NUT LOCK.
APPLICATION FILED AUG. 6, 1910.
1,008,248.
Patented Nov. 7, 1911.
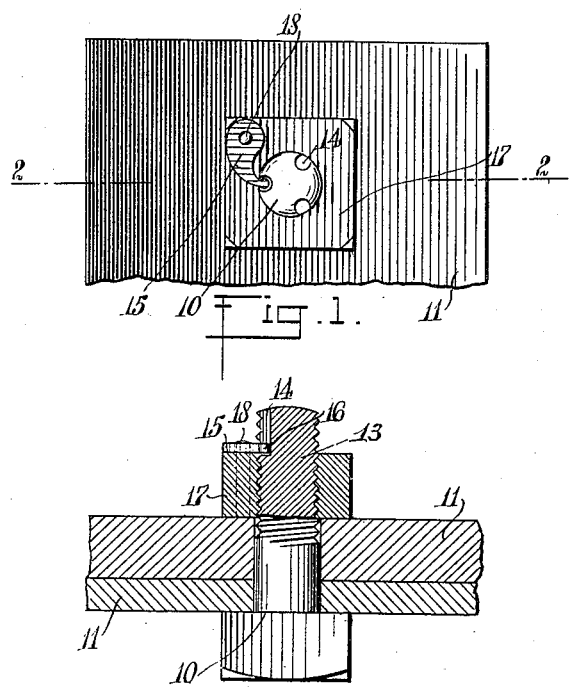
INVENTOR
Hamilton T. Earles

UNITED STATES PATENT OFFICE.

HAMILTON THEADORE EARLES, OF MOUNT MORRIS, PENNSYLVANIA.

NUT-LOCK.

1,008,248.  Specification of Letters Patent.  Patented Nov. 7, 1911.

Application filed August 6, 1910. Serial No. 575,894.

*To all whom it may concern:*

Be it known that I, HAMILTON T. EARLES, a citizen of the United States, and a resident of Mount Morris, in the county of Green and State of Pennsylvania, have invented a new and Improved Nut-Lock, of which the following is a full, clear, and exact description.

The invention relates to nut locks, more particularly to a nut lock of the "nut carried pawl" type, and has for an object to provide a device of this class for removably securing a nut to a bolt to prevent the nut from being released from the bolt by any vibration or the like. For the purpose mentioned, use is made of a nut having a pawl thereon, a swaged pin for movably securing the pawl, and a bolt provided with grooves adapted to removably receive an end of the pawl to secure the nut on the bolt.

Reference is to be had to the accompanying drawings constituting a part of this specification, in which similar characters of reference denote corresponding parts in both views, and in which—

Figure 1 is a view looking at the end of a bolt and showing my nut lock secured thereto; and Fig. 2 is a sectional view taken on the line 2—2 in Fig. 1.

Referring more particularly to the drawings, a bolt 10 is provided, and disposed to pass through suitable sheets of material 11, with the head 12 of the bolt on one side of the material 11 and the screw-threaded end 13 of the bolt extended beyond the other side of the material 11. A plurality of grooves 14 extend longitudinally of the bolt 10 as will be seen in Fig. 2, and a pawl 15 is adapted to extend into one of the said grooves 14. The pawl 15 is mounted on a nut 17 by a pin 18, swaged on the nut so that the pawl 15 can be moved into and out of the grooves 14.

Referring particularly to Fig. 1 of the drawings, it will be noted that the free end of the pawl 15 is provided with an enlarged or ball-shaped portion 16, the radius of which, when the parts are in the position shown in Fig. 1, has the same center as the center of the circular groove 14; such construction allows a maximum of the periphery of the bolt to have a threaded portion thereon, and at the same time provides a recess of sufficient depth to insure a firm engagement of the parts. It will also be noted that the outer edges of these grooves 14 in the bolt 10 converge, thereby affording a firm engagement between either of said edges and that portion of the ball-shaped end 16 of the pawl 15. By reason of such construction it will be apparent that movement of the nut 17 when the pawl is in engagement in the groove therein, in either direction is prevented; such a conformation of the end of the pawl and the grooves does away with the necessity of any spring member engaging the pawl or any removable member for engagement therewith in order to hold the pawl in the recess.

To secure the nut to a bolt, the nut is first screwed thereon to the desired depth, and the ball-shaped end 16 of the pawl 15 is then moved into one of the grooves 14. Thus the bolt will be securely held in place and the nut will be secured to the bolt so that any vibration of machinery, or the like, will not release the nut from the bolt.

Having thus described my invention, what I claim as new and desire to secure by Letters Patent is:—

A nut lock comprising a bolt provided with a plurality of circular grooves extending longitudinally of the bolt and at one end thereof, a nut for engagement with the bolt and a pawl having a ball-shaped free end pivoted on the said nut, the said ball-shaped portion fitting into one of the said grooves in the bolt when the nut engages the bolt. whereby, when the pawl is in engagement with the said groove, the nut is held against turning in either direction.

In testimony whereof I have signed my name to this specification in the presence of two subscribing witnesses.

HAMILTON THEADORE EARLES.

Witnesses:
E. F. BEALL,
J. W. ROGERS.

Copies of this patent may be obtained for five cents each, by addressing the "Commissioner of Patents, Washington, D. C."